United States Patent Office 3,487,048
Patented Dec. 30, 1969

3,487,048
PRODUCTION OF WATER SOLUBLE OR WATER DISPERSIBLE METHYLATED MELAMINE-FORMALDEHYDE RESINS CONSISTING LARGELY OF TRI-METHYL ETHER OF TRI-METHYLOL MELAMINE
Hendrik H. Deuzeman, Watford, Ontario, Canada, assignor to Fiberglas Canada Limited, Toronto, Ontario, Canada
No Drawing. Filed Apr. 30, 1968, Ser. No. 725,921
Claims priority, application Canada, Oct. 5, 1967, 001,780
Int. Cl. C08g 9/30
U.S. Cl. 260—67.7                    10 Claims

ABSTRACT OF THE DISCLOSURE

Water soluble alkylated methylol melamines are produced by reaction of a melamine with formaldehyde. The reaction can be carried out in the presence of an acidic catalyst in methyl alcohol solvent, after which the material is neutralized with alkali.

---

This invention relates to a method of preparing water soluble alkylated melamine-formaldehyde resins which are suitable for use in conjunction with resins such as phenolic resol type resins in the manufacture of glass fibre products. More particularly, this invention relates to a methylated melamine-formaldehyde condensation product of a ratio of melamine to formaldehyde between 1:3 mol to 1:6 mol.

The manufacture of water-soluble alkylated methylol melamines has been described in numerous references. For example in U.S. Patent 2,998,411 issued Aug. 29, 1961, in the name of Housekeeper, melamine is reacted with a non-alcoholic aqueous solution of formaldehyde under alkaline conditions to obtain the methylol melamine. The reaction products is filtered, added to a monohydric alcohol and acidic conditions employed to produce an alkylated melamine-formaldehyde product. Another method of preparing the methylated methylol melamines is described in Canadian Patent 456,309 issued May 3, 1949, to West et al. wherein melamine is refluxed with aqueous formaldehyde under alkaline pH conditions. Methanol is then added to the clear solution obtained together with oxalic acid and the mixture boiled. The solution is neutralized and made alkaline, cooled and concentrated by vacuum distillation to obtain a substantially anhydrous syrup.

In all of the prior processes the methylated melamine resins are produced from methylol melamine obtained under alkaline conditions, with subsequent separate alkylation of the methylol melamine.

It is thus the primary object of the present invention to provide a new and improved process for the production of methylated melamine-formaldehyde resins.

In accordance with the present invention the methylol melamine is not separated and the reaction is carried out in a carefully controlled acidic alcohol environment. Basically the present process comprises forming the methylated melamine-formaldehyde resin in an acidic environment by reacting melamine with formaldehyde in methyl alcohol. As catalyst an acidic compound is employed as a hydrogen ion donor and the solution may be neutralized at the end of the reaction by the addition of an alkali such as sodium or barium hydroxide. The reaction may be carried out at atmospheric pressure and at temperatures up to about 140° F. The reaction may also be performed under reflux conditions or in any other conventional manner known to those skilled in this art.

Among the acids which have been found useful in addition to the preferred sulfamic acid are: N-methylsulfanilic acid, 2-naphthalene sulfonic acid, and N/10 hydrochloric acid. The reaction appears to proceed satisfactorily so long as the hydrogen ion concentration in the mixture of formaldehyde and alcohol is of the order of $1.58 \times 10^{-1}$. Careful maintenance of the pH during reaction is important, and the pH should preferably not be permitted to fall much below 5.9.

In carrying out the present invention I have found that the alcohol formaldehyde should be added first to a reactor vessel and a suitable acid catalyst, such as sulfamic acid, dispersed under agitation throughout the liquid. Further methyl alcohol is then added to this mixture while increasing the agitation. The pH of the mixture of formaldehyde, catalyst and alcohol is at this point about 1.1 to 2.0. When these three components have been thoroughly mixed melamine is then added and dispersed throughout the mixture. The pH of the mixture after the melamine addition is about 6.0. The mix is continuously agitated and as the reaction proceeds the pH reaches about 6.7–6.8 and then falls off rapidly as the reaction goes to completion. The agitation is continued until such times as the free formaldehyde content of the mixture is reduced to about 16% or less. The solution, which is now practically clear, is neutralized with alkali to a pH of up to 8.5. Excess alcohol may be removed, if necessary, by vacuum distillation to obtain a solids content of the resin of about 70–75%.

The bulk of the resulting resin appears to consist of the tri-methyl ether of tri-methylol melamine, as indicated by infrared spectrophotometry.

The invention will be more clearly understood from the following examples which are only illustrative of the invention.

EXAMPLE I 963 parts by weight of 55% formaldehyde in alcoholic solution is added together with 0.547 part by weight of powdered sulfamic acid to a reactor vessel having agitation means. After the powdered catalyst is well dispersed 350 parts by weight of methanol is added and the agitation increased for maximum dispersion. 500 parts by weight of melamine crystals are then carefully added to this mixture. The agitated mixture is maintained at a constant temperature of about 95° F. and periodic checks of pH are made to verify that the pH remains above about 5.9. The free formaldehyde content of the solution is checked until the free formaldehyde content has dropped to below about 16% preferably to below about 8%. The resin solution obtained is practically clear and may be used in the acidic state, however, as this resin is to later be mixed with other resins, I preferably neutralize the solution to a pH of about 7.2 with sodium hydroxide.

EXAMPLE II

To a reactor vessel, equipped with means for agitation and for reflux vapour condensation, 282 parts by weight of a 55% formaldehyde solution in alcohol (methanol) were added. At room temperature and under agitation 0.126 parts by weight of powdered sulfamic acid were added and dispersed in the liquid. 126 parts by weight of melamine crystals were carefully added to the dispersion in the reactor at a temperature of 85–95° F., until uniformly dispersed. The temperature of the reactor content was then raised to approximately 176° F. (the boiling temperature of the solvent) and reacted under continued agitation under reflux conditions, and at a pH of about 5.9. The unreacted formaldehyde content of the solution was checked at regular intervals and the reaction continued until it was reduced to below 16%, or preferably to below about 8%. The acidic reactor content was then cooled off to room temperature to terminate the reaction, and brought to a pH of 7.25 by addition of triethanolamine. When carried out under these conditions, the reaction was completed in less time than when operating as per Example I, but resulted in a product of essentially the same properties.

I claim:
1. A process for producing a water soluble or water dispersible methylated melamine formaldehyde resin which comprises reacting melamine and formaldehyde in a molar ratio of from 1:3 to 1:6 with methyl alcohol, at an elevated temperature not exceeding 140° F., said reaction being carried out under acidic conditions in the presence of an acid selected from the group consisting of sulfamic acid and N-methyl sulfanilic acid, wherein the pH of the mixture does not fall below about 5.9, then neutralizing the reaction mixture by the addition of alkali.

2. The process as defined in claim 1, wherein the temperature of the reaction is maintained at about 90 to 100° F.

3. The process as in claim 1, wherein the reaction is carried out under reflux conditions.

4. The process as defined in claim 1 wherein the reaction is continued until the unreacted formaldehyde content of the mixture is reduced to about 16% or less.

5. The process as defined in claim 1, wherein the reaction is continued until the free formaldehyde content of the mixture is reduced to about 8% or less.

6. A process for producing a water soluble or water dispersible melamine formaldehyde resin comprising the tri-methyl ether or tri-methylol melamine which comprises mixing formaldehyde, methyl alcohol, and an acidic catalyst selected from the group consisting of sulfamic acid and N-methyl sulfanilic acid to form a mixture having a pH in the range of from 1.1 to 2, adding melamine to said mixture in an amount such that the molar ratio of melamine to formaldehyde is from 1:3 to 1:6 and the pH of said mixture increases to about 6, reacting said melamine and formaldehyde with said methyl alcohol at an elevated temperature not exceeding 140° F. under acidic conditions wherein the pH of the reaction mixture does not fall below about 5.9, then neutralizing the reaction mixture by the addition of alkaline.

7. The process of claim 6 wherein the acid is sulfamic acid.

8. The process of claim 6 wherein the temperature of the reaction is maintained at about 90 to 100° F.

9. The process as in claim 6 wherein the reaction is continued until the unreacted formaldehyde content of the mixture is reduced to about 16% or less.

10. The process as in claim 6 wherein the reaction is continued until the free formaldehyde content of the mixture is reduced to about 8% or less.

References Cited

UNITED STATES PATENTS

| | | | |
|---|---|---|---|
| 3,322,762 | 5/1967 | Erickson et al. | 260—67.6 |
| 3,394,093 | 7/1968 | Salem | 260—67.6 |

WILLIAM H. SHORT, Primary Examiner

T. PERTILLA, Assistant Examiner

PO-1050
(5/69)

UNITED STATES PATENT OFFICE
CERTIFICATE OF CORRECTION

Patent No. 3,487,048      Dated December 30, 1969

Inventor(s) Hendrik H. Deuzeman

It is certified that error appears in the above-identified patent and that said Letters Patent are hereby corrected as shown below:

In column 3, claim 6, line 3, change "or" to read -- of -- .

SIGNED AND SEALED

SEP 29 1970

(SEAL)
Attest:

Edward M. Fletcher, Jr.
Attesting Officer

WILLIAM E. SCHUYLER, JR.
Commissioner of Patents